United States Patent [19]
Zeiler

[11] 3,915,487
[45] Oct. 28, 1975

[54] STABILIZED COUPLING LINK FOR CHAIN AND HOOK ASSEMBLY
[75] Inventor: Horst Zeiler, Dover Township, York County, Pa.
[73] Assignee: Teledyne, Inc., York, Pa.
[22] Filed: Sept. 5, 1974
[21] Appl. No.: 503,490

[52] U.S. Cl. .......................... 294/78 R; 59/84; 59/90
[51] Int. Cl.² ............................................ B66C 1/14
[58] Field of Search ........ 294/74, 78 R, 82 R, 83 R; 24/116 R, 230.5 R, 230.5 LH, 230.5 CR, 24/230.5 AD, 265 CC, 265 H, 265 AL; 59/84–86, 88, 90, 92, 93

[56] References Cited
UNITED STATES PATENTS

| 533,311 | 1/1895 | Mitchell | 59/93 UX |
|---|---|---|---|
| 1,562,908 | 11/1925 | Morris et al. | 59/85 |
| 2,430,966 | 11/1947 | Taylor | 59/90 |
| 2,538,356 | 1/1951 | Donda | 59/85 |
| 2,869,255 | 1/1959 | Page | 59/86 X |
| 3,606,441 | 9/1971 | Ridgely | 294/78 R |
| 3,808,650 | 5/1974 | Guthans | 24/230.5 CR |

Primary Examiner—Richard A. Schacher
Assistant Examiner—Johnny D. Cherry
Attorney, Agent, or Firm—Shoemaker and Mattare, Ltd.

[57] ABSTRACT

A stabilized coupling link for a chain and hook assembly wherein the coupling link has a first curved end for connection with the link of a chain and a second curved end for connection with the eye of a hook to join the hook to the chain, and a coupling link stabilizer fixed to the coupling link and extending on opposite sides of the hook and engageable with opposite sides of the hook to substantially limit movement of the coupling link to pivotal movement about an axis substantially along the axis of the eye of the hook, thus preventing twisting and jamming of the coupling link and chain during initial lifting movement of the hook.

7 Claims, 7 Drawing Figures

STABILIZED COUPLING LINK FOR CHAIN AND HOOK ASSEMBLY

BACKGROUND OF THE INVENTION

For lifting heavy objects, such as ladles for molten steel and the like, industry often uses sling chain assemblies. Such assemblies generally comprise a master link to which are attached one or more branches, each having a hook at its outer end. The branches or chains are connected to the hooks by means of a coupling link, which in a preferred construction is of generally pear shaped configuration, although other shapes could be utilized, and the coupling link has a first curved end connected with an endmost link in the branch chain and a second curved end received in the eye of the hook.

During some uses of such sling chain assemblies, the branch chain is allowed to go slack when the hook is in place on the object being lifted and prior to the initial lifting of the object, whereby several links of the branch chain hang down adjacent the hook. Under these circumstances, it has been found that the chain will often become twisted and jammed at the hook end of the branch chain at the start of a subsequent vertical lift. Such twisting prevents a true vertical lift, shortens the branch chain in which it occurs, and if the twisted portion slips back into its normal orientation during the lift, the sudden drop of the object puts excessive force on the assembly. In some instances, this sudden drop of the object could have catastrophic results, such as, for example, if the sudden drop dislodges the hook from its position on the object being lifted.

According to the present invention, a stabilized coupling link is provided which resists such twisting of the chain and thereby prevents the hook from assuming an undesirable or unsafe position at the beginning of or immediately prior to an initial vertical lift.

OBJECT OF THE INVENTION

It is an object of this invention to provide a stabilized coupling link for joining a chain to a hook, wherein the coupling link has stabilizing means thereon engageable with the hook to prevent twisting of the chain immediately prior to lifting an object with the hook, whereby jamming and foreshortening of the chain is precluded.

DETAILED DESCRIPTION OF THE INVENTION

Figure 1:
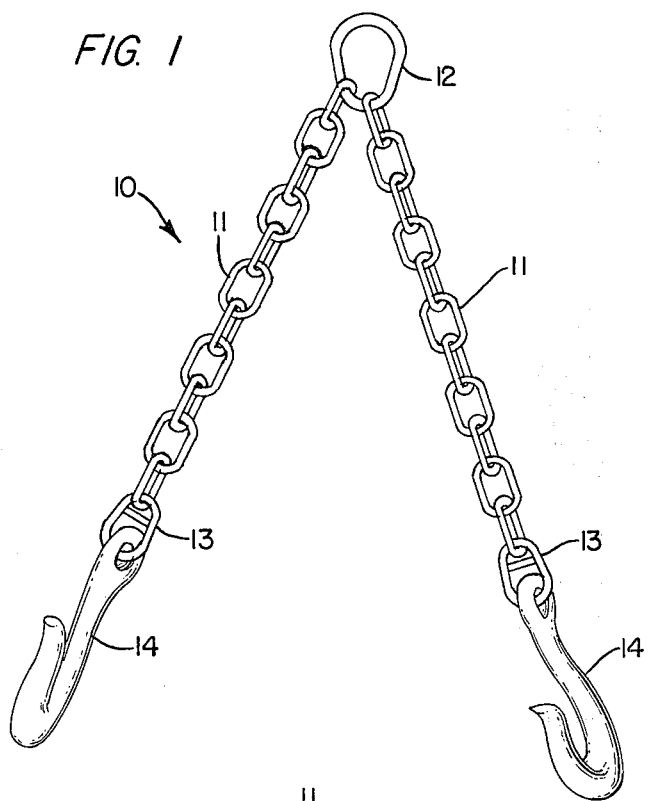
FIG. 1 is a perspective view of a sling chain assembly according to the invention.
Figure 2:
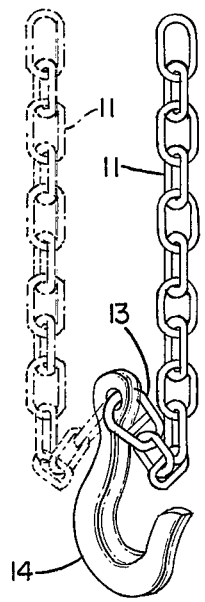
FIG. 2 is a perspective view of a branch chain and hook according to the invention, showing the coupling link and chain looped forwardly in full lines and rearwardly in phantom line, these two positions being extreme limits of travel of the coupling link and chain relative to the hook, movement of the coupling link to opposite sides of the hook being prevented by the stabilizing means.

In the drawings, wherein like reference numerals indicate like parts throughout the several views, a sling chain assembly is indicated generally at 10 in FIG. 1 and comprises a pair of branch chains 11 connected at one of their ends to a master link 12 and connected at their other ends to coupling links 13, which are in turn connected with the eyes of hooks 14.

Figure 3:
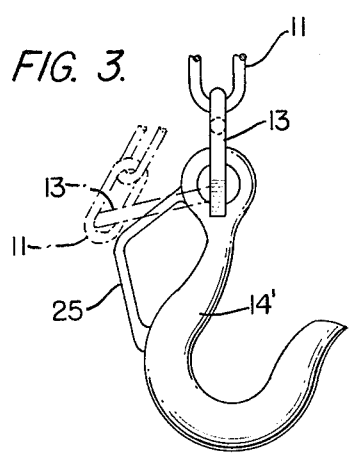
FIG. 3 is a view in elevation of the hook and coupling link of the invention.
Figure 4:
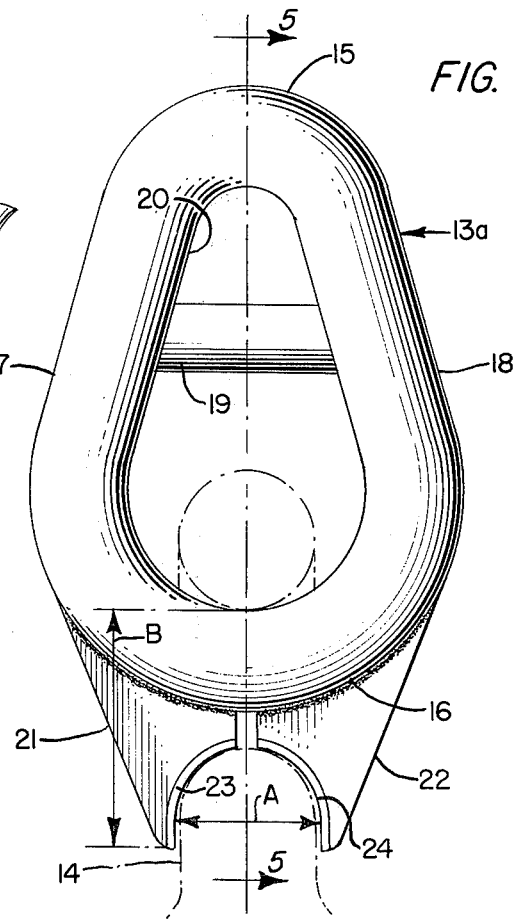
FIG. 4 is a greatly enlarged front view in elevation of a preferred form of coupling link according to the invention.
Figure 5:
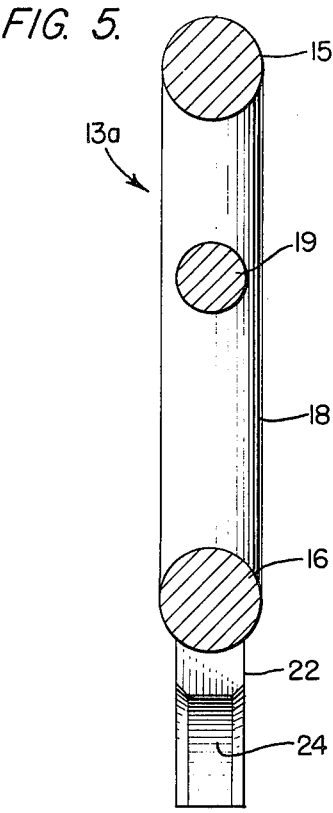
FIG. 5 is a view in section taken along line 5—5 in FIG. 4.

A preferred form of coupling link 13a is illustrated in FIG. 4 and has a first curved end 15 and a second curved end 16, the curved ends being connected by opposite substantially straight sides 17 and 18. A transversely extending restraining bar 19 is welded or otherwise suitably affixed between opposite straight sides of the coupling link adjacent the first curved end 15 thereof for confining the end link of a branch chain 11 to the space 20 defined between the restraining bar 19 and first curved end 15 of the coupling link. A pair of substantially identical stabilizing members 21 and 22 are welded or otherwise suitably affixed to the outer curved portion of the second curved end 16 of the coupling link, and each of the stabilizing members has arcuately shaped lower end portions 23 and 24, respectively, which engage with opposite sides of a hook 14 to limit movement of the coupling link substantially to pivotal movement about a line generally along the axis of the eye of the hook. Moreover, if desired, an angularly shaped gusset or handle 25 may be affixed at one end thereof to the eye portion of the hook and at its other end to the body of the hook to define a stop against which the coupling link 13 will engage when it swings rearwardly of the hook 14', as seen in FIG. 3 in phantom lines, but also serves as a handle for manipulating the hook 14'.

Figure 6:
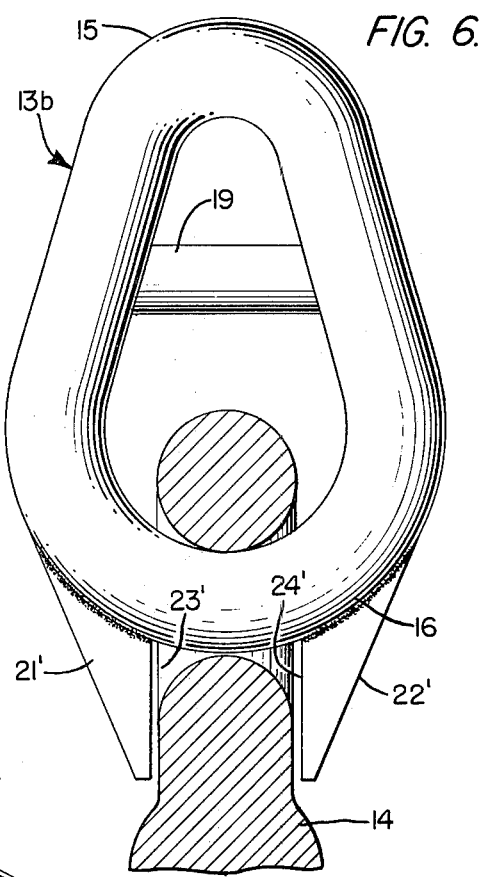
FIG. 6 is a view similar to FIG. 4 of a modified form of coupling link according to the invention.

A first modification of the invention is illustrated in FIG. 6 and is substantially identical to that illustrated in FIG. 4, with the exception that rather than the arcuately curved portions 23 and 24, the stabilizing elements 21' and 22' merely have straight surfaces 23' and 24' extending from the outer curved portion 16 of the coupling link downwardly to the lower free ends of the stabilizing elements or members 21' and 22'.

Figure 7:
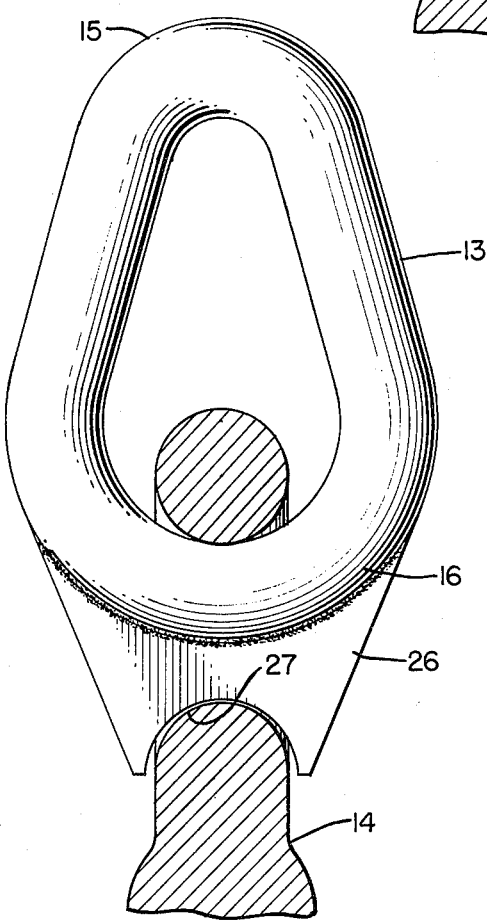
FIG. 7 is a view similar to FIG. 6 of a further modified form of the invention.

A second modification of the invention is illustrated in FIG. 7, and in this form of the invention, the restraining bar 19 is omitted, and rather than comprising two parts, the stabilizing means comprises a single element 26 having an arcuate concave lower end 27, which engages with the hook 14 to prevent or limit movement of the hook in a manner described above.

The first two described forms of the invention, as illustrated in FIGS. 4 and 6, are preferred, since in one common method of assembling the sling chain assembly, the coupling link 13 is initially split at its lower or second curved end and the link is inserted into the eye of the hook and then welded together to complete the assembly, and by providing split stabilizing members 21 and 22, one of the stabilizing members can be applied after the link is inserted through the eye of the hook, thus facilitating assembly of the invention.

Preferably, the distance A between opposed facing inner surfaces of the stabilizing members is only slightly greater than the thickness of the eye portion of the hook, and the distance B between the inner surface of the bottom curved portion 16 of the coupling link and the lower end of the stabilizing means should be greater than the inside diameter of the hook eye.

Thus, according to the present invention, a hook coupling link is provided for joining a chain to a hook, wherein the link has a chain end for connection to a chain and a hook end for connection to the eye of a hook, said hook end having means thereon projecting in closely spaced relationship on opposite sides of the eye portion of a hook and engageable with the hook to restrain the coupling link to movement substantially in the plane of the hook eye and thus preventing twisting and jamming of the chain and coupling link.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A stabilized chain and hook assembly, said chain comprising a plurality of joined together links and said hook comprising a body having an upturned hook at one end thereof and an opening defining an eye at the other end thereof, said eye having an axis extending substantially perpendicular to the plane of the hook, and a closed, substantially planar coupling link having a first curved end connected with an endmost link of the chain and a second curved end connected with the eye of the hook, joining the hook to the chain, and coupling link stabilizing means fixed to the coupling link and engageable with the hook to substantially limit movement of the coupling link to pivotal movement about a line substantially along the axis of the eye of the hook, thus preventing twisting and jamming of the chain and the coupling link, said stabilizing means including a restraining bar fixed at its opposite ends to opposed, spaced inner portions of the coupling link adjacent said first curved end thereof and spanning the space between said inner portions and defining a reduced opening at said first end of the coupling link in which said endmost link of the chain is received, and at least one stabilizing element welded to an outer end surface portion of the second curved end of the link and projecting therefrom in the plane of the link and having spaced apart, opposed hook-engaging surfaces disposed on opposite sides of the hook.

2. A stabilized coupling link as in claim 1, wherein the stabilizing means further includes an angularly shaped gusset fixed at one end to the eye portion of the hook on a side thereof opposite the upturned hook and fixed at the other end thereof to the hook body, said coupling link engageable therewith to limit pivotal movement of the coupling link relative to the hook when the chain is made slack.

3. A stabilized coupling link as in claim 2, wherein the gusset also comprises a handle to facilitate manipulation of the hook.

4. A stabilized coupling link as in claim 1, wherein the stabilizing element comprises two members fixed at their proximal ends to said outer surface portion of the second curved end of the coupling link and extending on opposite sides of the eye of the hook, the distance from an inner surface of the second curved end of the coupling link to the distal ends of the members being greater than the largest dimension in the opening of the eye of the hook.

5. A stabilized coupling link as in claim 4, wherein the distal ends of the members are arcuately shaped and conform to the shape of the hook eye.

6. A stabilized coupling link as in claim 4, wherein the members have straight inner surfaces extending from the proximal ends to the distal ends thereof.

7. A stabilized coupling link as in claim 1, wherein the stabilizing element comprises a single member fixed to said outer surface portion of the coupling link and having an arcuate lower end portion shaped complemental to the shape of the eye of the hook.

* * * * *